United States Patent
Ishioka et al.

(10) Patent No.: US 12,420,706 B2
(45) Date of Patent: Sep. 23, 2025

(54) CONTROL DEVICE

(71) Applicant: HONDA MOTOR CO., LTD., Tokyo (JP)

(72) Inventors: Atsushi Ishioka, Saitama (JP); Takuma Ando, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 39 days.

(21) Appl. No.: 18/128,038

(22) Filed: Mar. 29, 2023

(65) Prior Publication Data

US 2023/0311761 A1    Oct. 5, 2023

(30) Foreign Application Priority Data

Mar. 30, 2022   (JP) .................................. 2022-057685

(51) Int. Cl.
| | |
|---|---|
| *B60Q 9/00* | (2006.01) |
| *B60R 25/30* | (2013.01) |
| *B60R 25/31* | (2013.01) |
| *B60R 25/34* | (2013.01) |
| *B60R 25/40* | (2013.01) |

(52) U.S. Cl.
CPC ............ *B60Q 9/008* (2013.01); *B60R 25/305* (2013.01); *B60R 25/31* (2013.01); *B60R 25/34* (2013.01); *B60R 25/40* (2013.01)

(58) Field of Classification Search
CPC ....... B60Q 9/008; B60R 25/305; B60R 25/31; B60R 25/34; B60R 25/40
USPC ....................................................... 340/436
See application file for complete search history.

(56) References Cited

U.S. PATENT DOCUMENTS

| | | | | |
|---|---|---|---|---|
| 4,896,906 A | * | 1/1990 | Weinerman | E05B 85/243 292/341.12 |
| 5,117,665 A | * | 6/1992 | Swan | E05B 85/243 70/264 |
| 5,134,392 A | * | 7/1992 | Takeuchi | H01Q 21/24 340/426.36 |
| 5,963,987 A | * | 10/1999 | Walls | A41D 25/00 2/144 |
| 6,147,598 A | * | 11/2000 | Murphy | B60R 25/305 340/904 |

(Continued)

FOREIGN PATENT DOCUMENTS

JP    H07-323787 A    12/1995

*Primary Examiner* — Brian A Zimmerman
*Assistant Examiner* — Thang D Tran
(74) *Attorney, Agent, or Firm* — Paratus Law Group, PLLC

(57) ABSTRACT

A control device for controlling a vehicle including an external sensor that acquires surrounding information of the vehicle and a notification device capable of executing a predetermined notification to an occupant of the vehicle, the control device including processing circuitry configured to execute alarm control for causing the notification device to execute the notification, when an object that has a possibility of colliding with the vehicle exists around the vehicle, based on the surrounding information acquired by the external sensor. The processing circuitry is capable of ending processing for the alarm control when a door of the vehicle is locked, and the processing circuitry ends the processing for the alarm control or continues the processing for the alarm control depending on a locking method for the door.

8 Claims, 5 Drawing Sheets

(56) References Cited

U.S. PATENT DOCUMENTS

| | | | |
|---|---|---|---|
| 8,378,801 B1* | 2/2013 | Freeman | B60R 22/48 |
| | | | 340/426.15 |
| 8,764,077 B2* | 7/2014 | Takagi | E05B 85/243 |
| | | | 292/336.3 |
| 9,741,224 B1* | 8/2017 | Singh | H04B 1/3816 |
| 10,214,118 B1* | 2/2019 | Jain | B60K 35/60 |
| 2003/0038732 A1* | 2/2003 | Watarai | G07C 9/00309 |
| | | | 340/13.24 |
| 2003/0117293 A1* | 6/2003 | Tang | B60R 25/2009 |
| | | | 340/12.54 |
| 2005/0030168 A1* | 2/2005 | Sakai | B60R 25/24 |
| | | | 340/426.13 |
| 2007/0216517 A1* | 9/2007 | Kurpinski | B60R 25/2036 |
| | | | 340/8.1 |
| 2009/0177336 A1* | 7/2009 | McClellan | B60R 25/209 |
| | | | 701/2 |
| 2011/0298580 A1* | 12/2011 | Nakashima | B60R 25/24 |
| | | | 340/3.1 |
| 2012/0050021 A1* | 3/2012 | Rao | G08B 21/24 |
| | | | 340/425.5 |
| 2012/0056734 A1* | 3/2012 | Ikeda | G08G 1/165 |
| | | | 340/425.5 |
| 2012/0194356 A1* | 8/2012 | Haines | G08G 1/161 |
| | | | 340/933 |
| 2012/0221189 A1* | 8/2012 | Konet | G01C 22/006 |
| | | | 702/158 |
| 2013/0006479 A1* | 1/2013 | Anderson | G07C 9/28 |
| | | | 701/49 |
| 2013/0109342 A1* | 5/2013 | Welch | G08B 21/22 |
| | | | 455/404.2 |
| 2014/0000165 A1* | 1/2014 | Patel | E05B 81/77 |
| | | | 292/201 |
| 2014/0001771 A1* | 1/2014 | Shibayama | E05B 81/14 |
| | | | 292/108 |
| 2015/0015385 A1* | 1/2015 | Tomita | G08G 1/205 |
| | | | 340/436 |
| 2016/0379466 A1* | 12/2016 | Payant | G08B 21/22 |
| | | | 340/457 |
| 2017/0147935 A1* | 5/2017 | Bai | B60R 16/037 |
| 2017/0210282 A1* | 7/2017 | Rodriguez Barros | B60Q 1/324 |
| 2017/0313247 A1* | 11/2017 | Hsu | G08G 1/165 |
| 2017/0316254 A1* | 11/2017 | Hariri | G06V 40/172 |
| 2017/0335605 A1* | 11/2017 | Kimura | E05B 81/72 |
| 2017/0370129 A1* | 12/2017 | Ring | E05B 81/76 |
| 2019/0112858 A1* | 4/2019 | Partsch | E05F 15/43 |
| 2019/0211587 A1* | 7/2019 | Ganeshan | B60Q 5/006 |
| 2019/0275888 A1* | 9/2019 | Kirsch | B60K 35/22 |
| 2019/0316393 A1* | 10/2019 | Huang | E05F 15/42 |
| 2019/0322215 A1* | 10/2019 | Tsang | E05C 17/006 |
| 2020/0026968 A1* | 1/2020 | Ciripanga | E05F 15/40 |
| 2020/0132831 A1* | 4/2020 | Nagy | G01S 13/931 |
| 2020/0262389 A1* | 8/2020 | Foster | B60Q 9/00 |
| 2020/0290567 A1* | 9/2020 | Funyak | B60R 25/102 |
| 2020/0298790 A1* | 9/2020 | Caron | B60Q 5/006 |
| 2021/0327169 A1* | 10/2021 | Garcia | G05D 1/0044 |
| 2021/0383670 A1* | 12/2021 | Rence | B60H 1/00742 |
| 2022/0005210 A1* | 1/2022 | Raveendran | B60Q 9/002 |
| 2022/0219643 A1* | 7/2022 | Hanson | G06V 40/172 |
| 2022/0234604 A1* | 7/2022 | Feldkamp | B60W 50/14 |
| 2023/0113964 A1* | 4/2023 | Norris | B60R 25/1004 |
| | | | 340/426.24 |

* cited by examiner

FIG. 5

| TYPE | LOCKING METHOD | | POSITION OF REMOTE CONTROL KEY | |
|---|---|---|---|---|
| | LOCKING TOOL | LOCKING OPERATION | | |
| EXTERIOR LOCKING | KEY | INSERT INTO KEYHOLE AND THEN TURN | | NO STAYING RISK OF OCCUPANT → END ALARM CONTROL |
| | SMART KEY SYSTEM | TOUCH DOOR LOCK SENSOR | — | |
| | | PRESS DOWN TAILGATE LOCK BUTTON | | |
| | | AUTO LOCK (AWAY FROM VEHICLE) | | |
| | LOCKING WITHOUT USING KEY | PUSH IN DOORKNOB OR PRESS LOCKING BUTTON OF MASTER DOOR LOCK SWITCH, AND CLOSE DOOR WHILE PULLING DOOR HANDLE | | |
| COMMUNICA-TION LOCKING | KEYLESS ENTRY SYSTEM | PRESS DOWN LOCKING BUTTON OF REMOTE CONTROL KEY | OUTSIDE VEHICLE | |
| | | | INSIDE VEHICLE | STAYING RISK OF OCCUPANT EXISTS → CONTINUE ALARM CONTROL |
| INTERIOR LOCKING | DOORKNOB | PUSH IN DOORKNOB | — | |
| | MASTER DOOR LOCK SWITCH | PRESS DOWN LOCKING BUTTON OF MASTER DOOR LOCK SWITCH | | |

CONTROL DEVICE

CROSS-REFERENCE TO RELATED APPLICATIONS

This application is based on and claims priority under 35 USC 119 from Japanese Patent Application No. 2022-057685 filed on Mar. 30, 2022, the entire content of which is incorporated herein by reference.

TECHNICAL FIELD

The present invention relates to a control device that controls a vehicle.

BACKGROUND ART

In recent years, efforts are made to provide access to a sustainable transportation system that considers vulnerable traffic participants. As one of these efforts, research and development on driving assistance techniques and automatic driving techniques for vehicles such as automobiles are conducted to further improve safety and convenience of traffic.

In recent years, vehicles equipped with a function of improving safety when occupants get off are developed. For example, in JPH07-323787A below, an LED is attached to a warning unit to a tip of a housing of a door mirror, and this LED faces a rear side of a vehicle when the door mirror is retracted, and blinks when an engine key is turned off, so as to warn a following vehicle that a person is getting off the vehicle.

In recent years, vehicles such as automobiles are required to improve not only safety but also energy consumption efficiency (for example, reduction of power consumption). In the related art, there is room for improvement from the viewpoint of reducing vehicle power consumption.

An aspect of the present disclosure relates to provide a vehicle control device capable of reducing power consumption of a vehicle.

SUMMARY OF INVENTION

According to an aspect of the present disclosure, there is provided a control device for controlling a vehicle including an external sensor that acquires surrounding information of the vehicle and a notification device capable of executing a predetermined notification to an occupant of the vehicle, the control device including processing circuitry configured to execute alarm control for causing the notification device to execute the notification, when an object that has a possibility of colliding with the vehicle exists around the vehicle, based on the surrounding information acquired by the external sensor. The processing circuitry is capable of ending processing for the alarm control when a door of the vehicle is locked, and the processing circuitry ends the processing for the alarm control or continues the processing for the alarm control depending on a locking method for the door.

BRIEF DESCRIPTION OF DRAWINGS

FIG. 5 is a diagram showing specific examples of door locking methods.

DESCRIPTION OF EMBODIMENTS

Hereinafter, an embodiment of a control device according to the present invention will be described with reference to the accompanying drawings.

[Vehicle]

Figure 1:
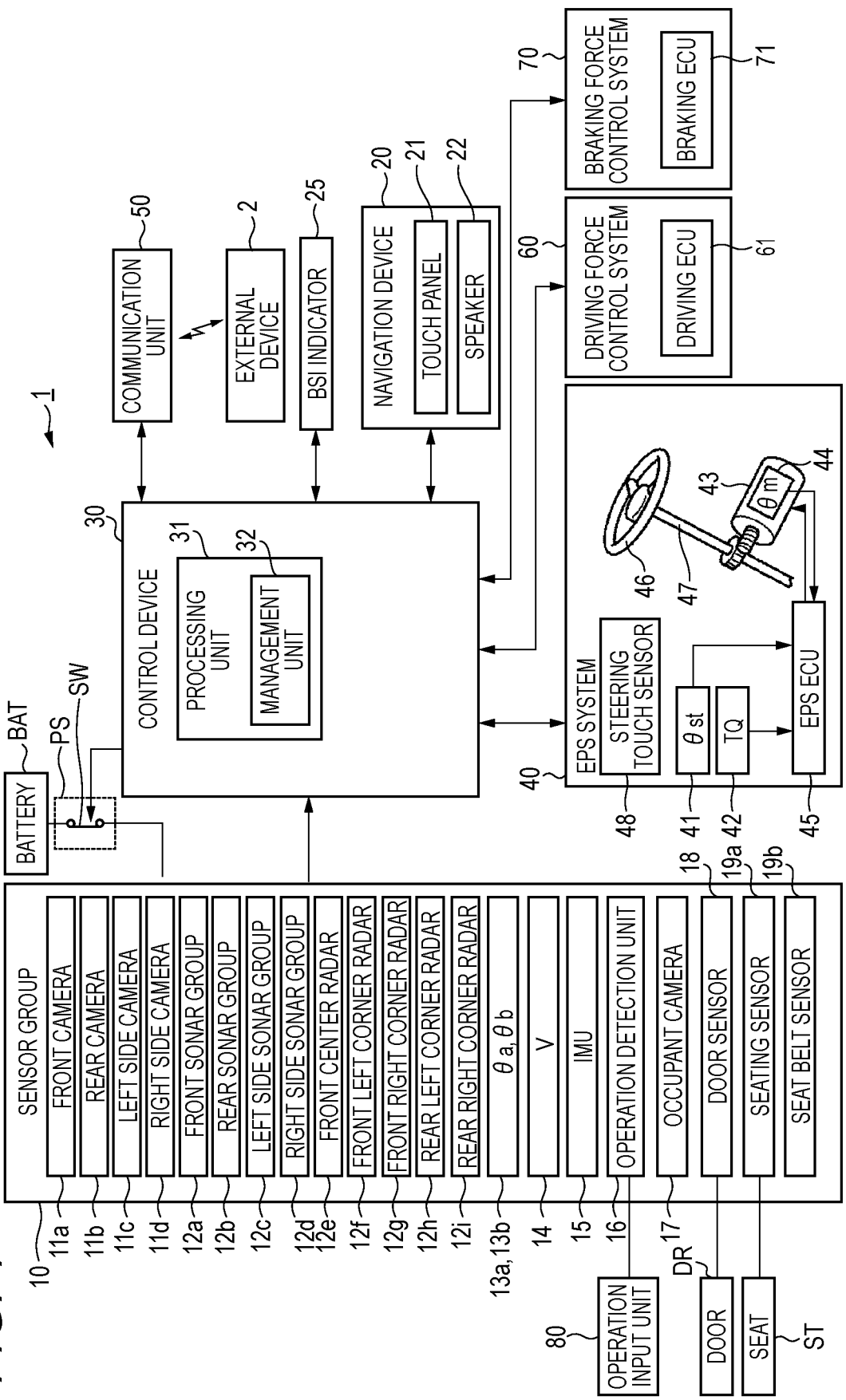
FIG. 1 is a block diagram showing a schematic configuration of a vehicle according to an embodiment.

A vehicle 1 according to the present embodiment shown in FIG. 1 is an automobile that includes a drive source, and wheels including drive wheels driven by power of the drive source and steerable steering wheels (both not shown). For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of the electric motor and the internal combustion engine. The drive source of the vehicle 1 may drive the pair of left and right front wheels, the pair of left and right rear wheels, or the four wheels including the pair of left and right front wheels and the pair of left and right rear wheels. The front wheels or the rear wheels may be steering wheels that are steerable, or the front wheels and the rear wheels may both be steering wheels that are steerable.

As shown in FIG. 1, the vehicle 1 includes a sensor group 10, a navigation device 20, a control device 30 which is an example of a control device according to the present invention, an electric power steering system (EPS system) 40, a communication unit 50, a driving force control system 60, a braking force control system 70, and an operation input unit 80.

Furthermore, the vehicle 1 includes a battery BAT as a power storage device that can function as a power for each component (for example, a sensor group 10) of the vehicle 1, a door DR that is opened and closed when an occupant gets on and off the vehicle 1, a seat ST on which the occupant that gets on the vehicle 1 sits, and a blind spot information (BSI) indicator 25 capable of executing a predetermined notification to the occupant that gets on the vehicle 1. Although FIG. 1 shows only one door DR and one seat ST, the vehicle 1 is generally provided with a plurality of doors DR and seats ST.

The sensor group 10 acquires various detection values related to the vehicle 1 or surrounding of the vehicle 1. The detection values acquired by the sensor group 10 are sent to the control device 30 and used for controlling the vehicle 1 by the control device 30. The sensor group 10 includes, for example, a front camera 11a, a rear camera 11b, a left side camera 11c, a right side camera 11d, a front sonar group 12a, a rear sonar group 12b, a left side sonar group 12c, a right side sonar group 12d, a front center radar 12e, a front left corner radar 12f, a front right corner radar 12g, a rear left corner radar 12h, and a rear right corner radar 12i, These cameras, sonar groups, radars, LIDARs, and the like can function as external sensors that acquire surrounding information of the vehicle 1.

The front camera 11a, the rear camera 11b, the left side camera 11c, and the right side camera 11d output image data of surrounding images acquired by capturing the surrounding of the vehicle 1 to the control device 30. The surrounding images captured by the front camera 11a, the rear camera 11*b*, the left side camera 11*c*, and the right side camera 11*d* are also called a front image, a rear image, a left side image, and a right side image, respectively. An image formed by the left side image and the right side image is also referred to as a side image. Note that the rear camera 11*b* that captures the rear image is an example of the external sensor that detects a rear side of the vehicle 1. The left side camera 11*c* that captures the left side image is an example of the external sensor that detects a lateral side (specifically a left side) of the vehicle 1. The right side camera 11*d* that captures the right side image is an example of the external sensor that detects a lateral side (specifically, a right side) of the vehicle 1.

The front sonar group 12*a*, the rear sonar group 12*b*, the left side sonar group 12*c*, and the right side sonar group 12*d* emit sound waves to the surrounding of the vehicle 1 and receive reflected sounds from other objects. The front sonar group 12*a* includes, for example, four sonars. The sonars that constitute the front sonar group 12*a* are provided at an obliquely left front side, a left front side, a right front side, and an obliquely right front side of the vehicle 1. The rear sonar group 12*b* includes, for example, four sonars. The sonars that constitute the rear sonar group 12*b* are provided at an obliquely left rear side, a left rear side, a right rear side, and an obliquely right rear side of the vehicle 1. The left side sonar group 12*c* includes, for example, two sonars. The sonars that constitute the left side sonar group 12*c* are provided on a front side of a left side of the vehicle 1 and a rear side of the left side of the vehicle 1. The right side sonar group 12*d* includes, for example, two sonars. The sonars that constitute the right side sonar group 12*d* are provided on a front side of a right side of the vehicle 1 and a rear side of the right side of the vehicle 1. Note that the rear sonar group 12*b* is another example of the external sensor that detects the rear side of the vehicle 1. The left side sonar group 12*c* is another example of the external sensor that detects the lateral side (specifically, the left side) of the vehicle 1. The right side sonar group 12*d* is another example of the external sensor that detects the lateral side (specifically, the right side) of the vehicle 1.

The front center radar 12*e*, the front left corner radar 12*f*, the front right corner radar 12*g*, the rear left corner radar 12*h*, and the rear right corner radar 12*i* emits radar waves to the surrounding of the vehicle 1 and receives radar waves reflected by other objects. More specifically, the front center radar 12*e* emits radar waves to a front side of the vehicle 1 and receives radar waves reflected by objects present in the front side of the vehicle 1. The front left corner radar 12*f* emits radar waves to an obliquely left front side of the vehicle 1 and receives radar waves reflected by objects present in the obliquely left front side of the vehicle 1. The front right corner radar 12*g* emits radar waves to an obliquely right front side of the vehicle 1 and receives radar waves reflected by objects present in the obliquely right front side of the vehicle 1. The rear left corner radar 12*h* emits radar waves to an obliquely left rear side of the vehicle 1 and receives radar waves reflected by objects present in the obliquely left rear side of the vehicle 1. The rear right corner radar 12*i* emits radar waves to an obliquely right rear side of the vehicle 1 and receives radar waves reflected by objects present in the obliquely right rear side of the vehicle 1. The radar wave from the front center radar 12*e*, the front left corner radar 12*f*, the front right corner radar 12*g*, the rear left corner radar 12*h*, and the rear right corner radar 12*i* can be, for example, a millimeter wave, but is not limited thereto, and may be a microwave, an ultrasonic wave, a laser, or the like. Note that the rear left corner radar 12*h* and the rear right corner radar 12*i* are other examples of the external sensors that detect the lateral sides and the rear side of the vehicle 1.

Furthermore, the sensor group 10 includes wheel sensors 13*a* and 13*b*, a vehicle speed sensor 14, an inertial measurement unit (IMU) 15, an operation detection unit 16, an occupant camera 17, a door sensor 18, a seating sensor 19*a*, and a seat belt sensor 19*b*.

The wheel sensors 13*a* and 13*b* detect rotation angles of the wheels (not shown). The wheel sensors 13*a* and 13*b* may be implemented by angle sensors or may be implemented by displacement sensors. The wheel sensors 13*a* and 13*b* output detection pulses to the control device 30 each time the wheels rotate by a predetermined angle. The detection pulses output from the wheel sensors 13*a* and 13*b* can be used to calculate the rotation angles and rotation speeds of the wheels. A traveling distance of the vehicle 1 can be calculated based on the rotation angles of the wheels. The wheel sensor 13*a* detects, for example, a rotation angle $\theta a$ of a left rear wheel. The wheel sensor 13*b* detects, for example, a rotation angle $\theta b$ of a right rear wheel.

The vehicle speed sensor 14 detects a travel speed of the vehicle 1 (vehicle body), that is, a vehicle speed V, and outputs the detected vehicle speed V to the control device 30. The vehicle speed sensor 14 detects the vehicle speed V based on, for example, rotation of a countershaft of a transmission.

The inertial measurement device 15 detects angular velocities of the vehicle 1 in a pitch direction, a roll direction, and a yaw direction, and accelerations of the vehicle 1 in a front-rear direction, a left-right direction, and an upper-lower direction, and outputs these detection results to the control device 30. Note that an example in which the inertial measurement device 15 is provided is described in the present embodiment, but the present invention is not limited thereto. For example, merely an acceleration sensor that detects an acceleration of the vehicle 1 in a predetermined direction or a gyro sensor that detects an angular velocity of the vehicle 1 in a predetermined direction may be provided instead of the inertial measurement device 15.

The operation detection unit 16 detects an operation content performed by a user using the operation input unit 80 and outputs the detected operation content to the control device 30. The operation input unit 80 may include, for example, an operation button that accepts an operation for switching between on (executable setting) and off (non-executable setting) of alarm control, which will be described later Note that the operation input unit 80 may be shared with a touch panel 21, which will be described later.

The occupant camera 17 is an imaging device that captures an image of an interior of the vehicle 1, and outputs image data obtained by capturing an image of the interior of the vehicle to the control device 30. For example, the occupant camera 17 is provided in a manner of being capable of capturing an image of the occupant seated on each seat ST The door sensor 18 detects opening, closing, unlocking, locking, and the like of each door DR. For example, the seating sensor 19*a* is provided corresponding to each seat ST, and detects whether the occupant is seated on the seat ST by detecting a pressure of a seat surface of the corresponding seat ST. The seat belt sensor 19*b* is provided corresponding to each seat ST and detects attachment and detachment of the seat belt provided on the corresponding seat ST. The occupant camera 17, door sensor 18, seating sensor 19*a*, and seat belt sensor 19*b* all function as occupant detection sensors for determining whether an occupant exists in the vehicle.

The navigation device 20 detects a current position of the vehicle 1 using a global positioning system (GPS) for example, and guides a user (hereinafter simply referred to as "user") of the vehicle 1 on a route to a destination. The navigation device 20 includes a storage device (not shown) provided with a map information database.

A navigation device 20 includes a touch panel 21 and a speaker 22. The touch panel 21 functions as an input device that receives input of various kinds of information input to the control device 30 and a display device that is controlled by the control device 30. That is, the user can input various commands to the control device 30 via, the touch panel 21. The touch panel 21 can display a screen for guiding and informing the user of various kinds of information. The speaker 22 outputs various kinds of information to the user by voice. The speaker 22 functions as a notification device capable of executing a notification to the occupant of the host vehicle, who is the user, with an alarm sound.

The control device 30 is mounted on the vehicle 1, is communicably connected to other devices mounted on the vehicle 1, and integrally controls the entire vehicle 1 by communicating with the other devices. The control device 30 is implemented by, for example, an electronic control unit (ECU) including a processor that executes various calculations, a storage device (storage medium) that stores various types of information, an input and output device that controls data input and output between an inner side and an outer side of the control device 30, and the like. Note that the control device 30 may be implemented by one ECU or may be implemented by a plurality of ECUs.

Examples of the other devices connected to the control device 30 (hereinafter also simply referred to as "other devices") include each camera, sonar group, radar, and sensor included in the sensor group 10, an EPS electronic control unit (EPSECU) 45 of the EPS system 40, a driving ECU 61 of the driving force control system 60, and a braking ECU 71 of the braking force control system 70.

Note that the EPSECU 45, the driving ECU 61, and the braking ECU 71 will be described later.

The control device 30 and the other devices are connected to each other via, for example, a wired communication network constituted by various wire harnesses, cables, connectors, and the like routed inside the vehicle 1. For example, a controller area network (CAN), a local interconnect network (LIN), Flex Ray, or a CAN with a flexible data rate (CANFD) can be adopted for the communication between the control device 30 and the other devices.

Although details will be described later, the control device 30 is capable of executing the alarm control for causing a predetermined notification to be executed to the occupant, when an object that has a possibility of colliding with the vehicle 1 exists around the vehicle 1, based on the surrounding information acquired by the sensor group 10. In the present embodiment, the notification by the alarm control is performed by lighting (including blinking) of the BSI indicator 25 and outputting a predetermined alarm sound from the speaker 22, but the present invention is not limited thereto. For example, the notification by the alarm control may be performed by causing the touch panel 21 or a display device referred to as a "multi-information display" to display a predetermined warning image.

The EPS system 40 includes a steering angle sensor 41, a torque sensor 41 an EPS motor 43, a resolver 44, the EPSECU 45, and a steering touch sensor 48.

The steering angle sensor 41, the torque sensor 42, and the steering touch sensor 48 can function as driving status sensors for acquiring operations from the driver on a steering 46. Specifically, the steering angle sensor 41, the torque sensor 42, and the steering touch sensor 48 detect (acquire) a steering angle θst of the steering 46, a torque TQ applied to the steering 46, and whether the driver touches the steering 46, respectively, and output the detection results to the control device 30.

For example, the EPS motor 43 can assist a steering operation of the driver by applying a driving force or a reaction force to a steering column 47 coupled to the steering 46. The resolver 44 detects a rotation angle θm of the EPS motor 43. The EPSECLU 45 controls the entire EPS system 40.

The driving force control system 60 includes the driving ECU 61. The driving force control system 60 executes driving force control of the vehicle 1. For example, the driving ECU 61 controls a driving force of the vehicle 1 by controlling an engine (not shown) or the like in response to an operation of the driver on an accelerator pedal (not shown) or an instruction from the control device 30.

The braking force control system 70 includes the braking ECU 71. The braking force control system 70 executes braking force control of the vehicle 1. The braking ECU 71 controls a braking force of the vehicle 1 by controlling a brake mechanism (not shown) or the like in response to an operation by the driver on a brake pedal (not shown) or an instruction from the control device 30.

The communication unit 50 is a communication interface that communicates with an external device 2 provided outside the vehicle 1 under control of the control device 30. That is, the control device 30 can communicate with the external device 2 via the communication unit 50. For example, a mobile communication network such as a cellular line, Wi-Fi (registered trademark), or Bluetooth (registered trademark) can be adopted for the communication between the vehicle 1 and the external device 2. The external device 2 is managed, for example, by a manufacturer of the vehicle 1. The external device 2 may be a virtual server (cloud server) implemented in cloud computing service, or may be a physical server implemented as a single device.

The battery BAT is capable of outputting electric power of approximately 12 [V], for example, and supplying the electric power to various accessories provided in the vehicle 1 such as the sensor group 10 through a power circuit PS. More specifically, the power circuit PS is provided with a switch SW that is turned on or off according to a control signal from the control device 30. When the switch SW is turned on (in a closed state), the power of the battery BAT is supplied to the sensor group 10 and the like, and when the switch SW is turned off (in an open state), the power of the battery BAT is not supplied to the sensor group 10 and the like. That is, the control device 30 can control power supply from the battery BAT to the sensor group 10 and the like by controlling the opening and closing of the switch SW Note that the switch SW can be implemented by, for example, a relay circuit or the like.

Figure 2:
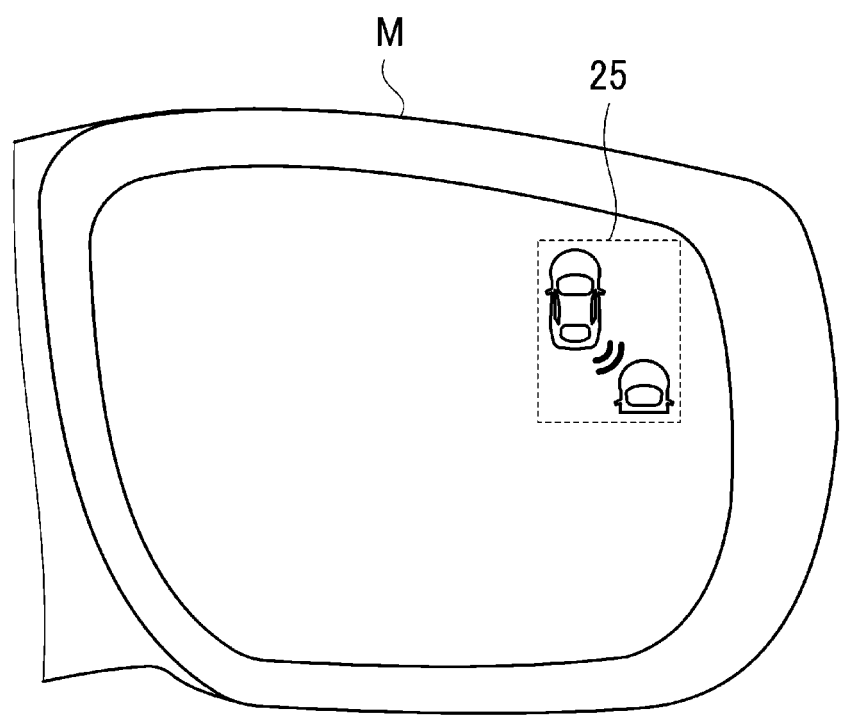
FIG. 2 is a diagram showing an example of a BSI indicator.

The BSI indicator 25 mainly includes a display device such as a lamp indicator or a liquid crystal display, for example, and lights up (including blinking) under control of the control device 30. For example, as shown in FIG. 2, the BSI indicator 25 is provided on a mirror surface portion of a door mirror M of the vehicle 1 (that is, a portion visible to the occupant from the interior of the vehicle). The vehicle 1 is provided with a pair of left and right door mirrors M, and a pair of left and right BSI indicators 25 are provided corresponding to the pair of left and right door mirrors M, respectively, and the left and right BSI indicators 25 both can be lit independently. Note that in the present embodiment, the BSI indicator 25 is provided on the door mirror M, but the present invention is not limited thereto, and the BSI indicator 25 may be provided on, for example, a vehicle-interior surface of a pillar (for example, a so-called "A pillar") of the vehicle 1.

[Control Device]

Next, an example of the control device 30 will be described in detail. As described above, the control device 30 is capable of performing the alarm control. With such alarm control, it is possible to notify that there is an object that may collide with the vehicle 1 around the vehicle 1, thereby improving the safety of the vehicle 1. On the other hand, in order for the control device 30 to execute various processing including the alarm control, it is necessary to supply power from the battery BAT to the sensor group 10, the control device 30, and the like, and power consumption of the vehicle 1 increases as a period during which the processing of the control device 30 is performed becomes longer. The increase in the power consumption is not preferable from the viewpoint of improving energy consumption efficiency of the vehicle 1 and from the viewpoint of preventing so-called "battery run-down". Therefore, in the present embodiment, it is possible to reduce the power consumption while ensuring the safety of the vehicle 1 by ending processing by the control device 30 such as the alarm control when it is considered that the occupant completes getting off the vehicle.

The control device 30 includes, for example, a processing unit 31 including a management unit 32, as a functional unit implemented by a processor executing a program stored in a storage device of the control device 30 or a functional unit implemented by an input and output device of the control device 30.

The processing unit 31 is capable of executing the alarm control of causing a notification device such as the BSI indicator 25 or the speaker 22 provided in the vehicle 1 to execute a predetermined notification, based on the surrounding information acquired by the sensor group 10, when an object that may collide with the vehicle 1 exists around the vehicle 1. For example, the processing unit 31 executes the alarm control when an ignition power of the vehicle 1 is turned off (that is, when the vehicle 1 is stopped). As a result, it is possible to notify the occupant who is about to get off the vehicle 1 that an object that may collide with the vehicle 1 exists around the vehicle 1.

The processing unit 31 also includes the management unit 32 capable of ending the processing by the processing unit 31. The management unit 32 is capable of ending the processing by the processing unit 31 according to a locking method for locking the door DR. That is, the management unit 32 may end the processing by the processing unit 31 or continue the processing by the processing unit 31 depending on the locking method for the door DR.

Hereinafter, in the present embodiment, an example in which the management unit 32 ends the alarm control as the processing by the processing unit 31 will be described, but the present invention is not limited thereto. That is, hereinafter, the "alarm control" may be read as the "processing by the processing unit 31". Examples of the processing by the processing unit 31 other than the alarm control that the management unit 32 can end include detecting an object that may collide with the vehicle 1. That is, the management unit 32 may prevent the processing unit 31 (that is, the control device 30) from even detecting an object that may collide with the vehicle 1, or may cause the processing unit 31 to detect an object that may collide with the vehicle 1 but not to perform the alarm control (in other words, the notification) based on a detection result, depending on the locking method for the door DR.

Specifically, the door DR can be locked using a plurality of types of locking methods such as exterior locking of locking the door by an operation from exterior of the vehicle, interior locking of locking the door by an operation from interior of the vehicle, and communication locking of locking the door in response to a locking request sent from a terminal device capable of communicating with the vehicle 1 (see FIG. 5, which will be described later). Note that the terminal device used for the communication locking can be, for example, a so-called "remote control key" that includes a lock button for sending the locking request and an unlock button for sending an unlocking request, but is not limited thereto, and may be a smartphone installed with a predetermined application or the like. In the present embodiment, the terminal device used for the communication locking is hereinafter described as a remote control key.

Examples of the exterior locking include locking by a method of inserting a physical mechanical key (hereinafter simply referred to as a "key") into a keyhole provided outside the door DR and then turning the key, locking using a smart key system such as touching a door lock sensor provided outside the door DR, and locking by a method of pushing a doorknob provided outside the door DR. Examples of the interior locking include locking by a method of pushing a doorknob provided inside the door DR, and locking by a method of pushing down a locking button of a master door lock switch. Examples of the communication locking include locking by a method of pressing down the lock button of the remote control key.

The management unit 32 ends the alarm control when the door DR is locked by the exterior locking. As a result, the control device 30 can end the alarm control when it is considered highly probable that the occupant completes getting off the vehicle.

When the door DR is locked by the communication locking, the management unit 32 determines whether the remote control key exists in the vehicle, and ends the alarm control based on determining that the remote control key does not exist in the vehicle. As a result, the control device 30 can end the alarm control when it is considered that the occupant completes getting off the vehicle. Note that any method may be used to determine whether the terminal device used for the communication locking, such as a remote control key, exists in the vehicle 1.

On the other hand, when the door DR is locked by the interior locking and it is determined that the remote control key exists in the vehicle even though the door DR is locked by the communication locking, the management unit 32 continues the alarm control. As a result, the control device 30 can continue the alarm control when it is considered that the occupant may exist in the vehicle.

[Example of Alarm Control]

Figure 3:
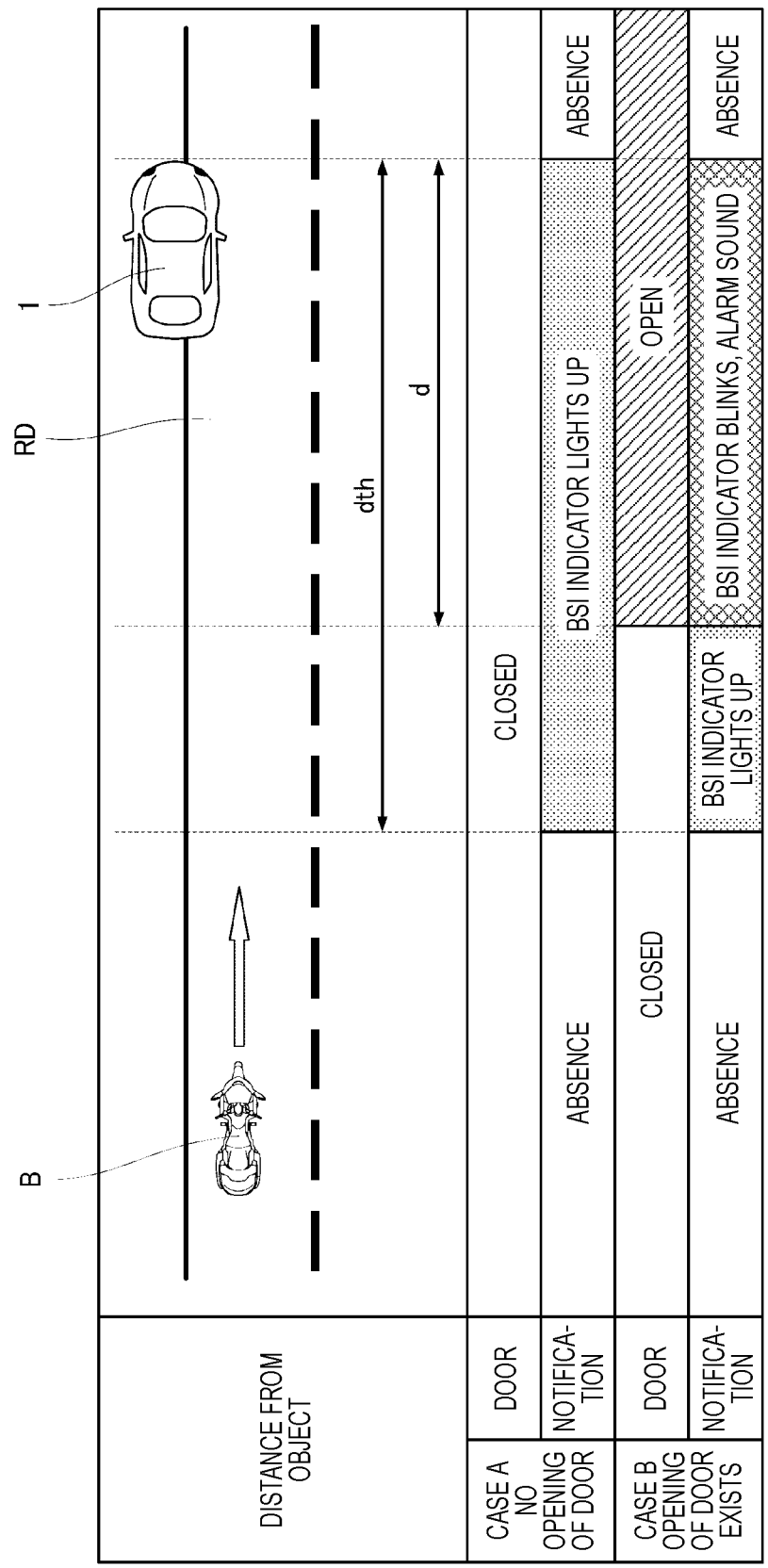
FIG. 3 is a diagram showing a specific example of alarm control.

Next, a specific example of the alarm control that can be executed by the control device 30 (for example, the processing unit 31) will be described with reference to FIG. 3. The example shown in FIG. 3 is an example in which a motorbike B as the other vehicle traveling on a road RD approaches the vehicle 1 from a right rear side of the vehicle 1 stopped on a shoulder of the road RD, Note that such a motorbike B can be detected by, for example, the extremal sensors that detect the lateral side (the right side in the example described here) and the rear side of the vehicle 1, such as the rear right corner radar 12*i*, the rear camera 11*b*, the right side camera 11*d*, the rear sonar group 12*b*, and the right side sonar group 12*d*.

The control device 30 can perform the alarm control in different forms depending on whether the door DR is opened or closed. Here, examples of the following case α and case β will be described.

Case α: The door DR of the vehicle 1 remains closed and is not opened.

Case β: The door DR of the vehicle 1 is initially closed, but is opened when a distance between the vehicle 1 and the motorbike B becomes d (which will be described later).

In the case α, when the distance between the vehicle 1 and the motorbike B becomes equal to or less than a threshold dth, the control device 30 starts the notification by the alarm control by, for example, lighting the BSI indicator 25 in a manner shown in FIG. 2. Then, when the motorbike B passes by the lateral side of the vehicle 1, the control device 30 ends the notification by the alarm control.

In the case β, when the distance between the vehicle 1 and the motorbike B becomes equal to or less than the predetermined threshold dth, the control device 30 starts the notification by the alarm control by lighting the BSI indicator 25 as in the case α. Then, the motorbike B further approaches the vehicle 1, and the door DR is opened when the distance between the vehicle 1 and the motorbike B becomes d (here, d<dth). In this case, the control device 30 increases an intensity of the notification by the alarm control at a timing during which the door DR is opened, and for example, causes the BSI indicator 25 to blink and the speaker 22 to output predetermined alarm sound. Then, when the motorbike B passes by the lateral side of the vehicle 1, the control device 30 ends the notification by the alarm control.

In this way, the safety of the vehicle 1 can be improved by performing the notification to the occupant when an object that may collide with the vehicle 1 exists on the lateral side or the rear side of the vehicle 1, which is likely to be a blind spot for the occupant.

Further, the control device 30 further executes the following processing in order to prevent an increase in power consumption due to continued execution of such alarm control after the vehicle 1 is stopped (after the ignition power is turned off), for example.

[Example of Processing Executed by Control Device]

Figure 4:
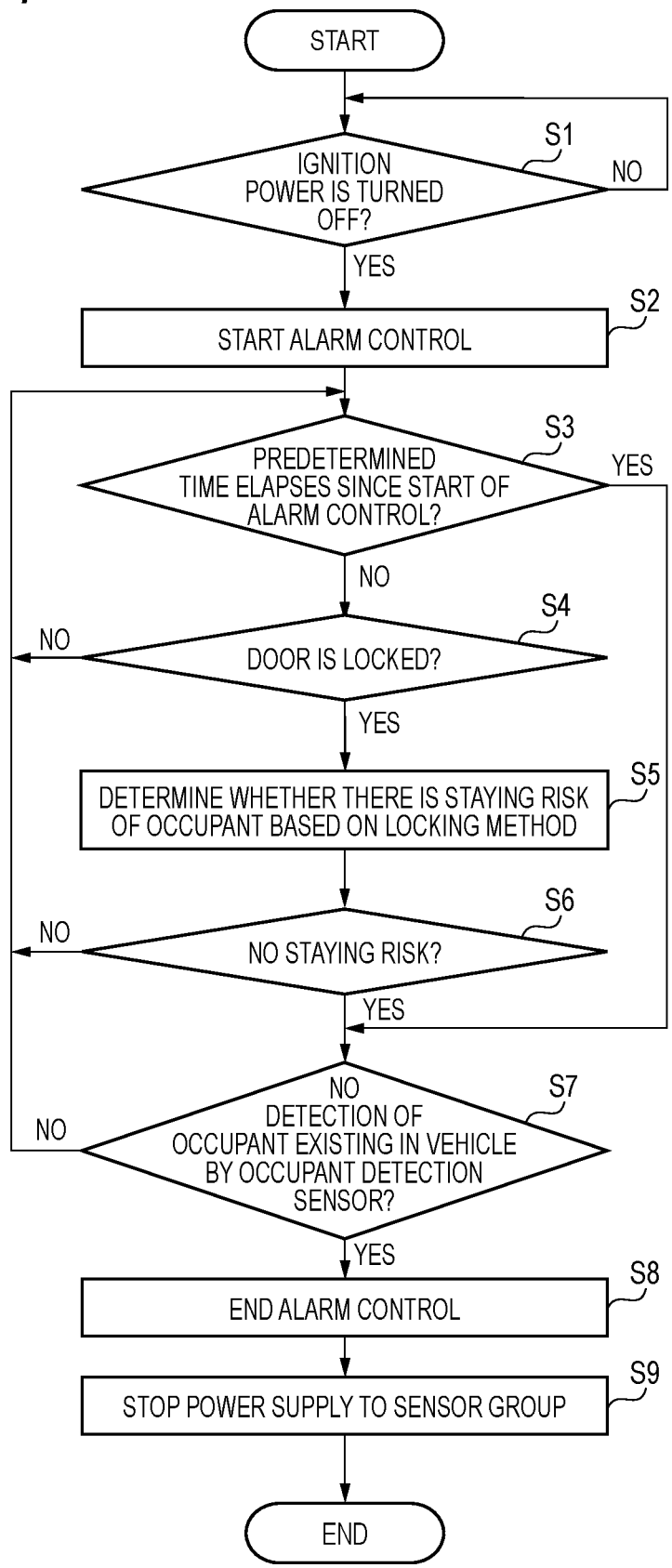
FIG. 4 is a flow chart showing an example of processing executed by a control device for preventing an increase in power consumption due to continued execution of the alarm control.

FIG. 4 is a flow chart showing an example of the processing executed by the control device 30 for preventing the increase in power consumption due to the continued execution of the alarm control. The control device 30 executes the processing shown in FIG. 4 when, for example, the ignition power of the vehicle 1 is turned on.

First, the control device 30 waits until the ignition power of the vehicle 1 is turned off (loops when step S1: No), and if the ignition power is turned off (step S1: Yes), starts the alarm control (step S2).

Then, the control device 30 determines whether a predetermined time (for example, 3 minutes or 6 minutes) elapses since the start of the alarm control (step S3). If the predetermined time elapses (step S3: Yes), the control device 30 proceeds to a step S7, which will be described later.

If the predetermined time does not elapse (step S3: No), the control device 30 determines whether the door DR is locked (step S4). As described above, the door DR can be locked by the plurality of types of locking methods such as the exterior locking of locking the door DR from the exterior of the vehicle, the communication locking of locking the door DR in response to the locking request sent from the terminal device (remote control key) capable of communicating with the vehicle 1, and the interior locking of locking the door DR while the occupant remains in the vehicle.

If the door DR is not locked (step S4: No), the control device 30 returns to the processing of the step S3. In this case, the alarm control can be continued. On the other hand, if the door DR is locked (step S4: Yes), the control device 30 determines whether there is a possibility that the occupant exists in the vehicle (hereinafter also referred to as a "staying risk") based on the locking method (step S5). Specific criteria for determining whether there is a staying risk will be described later with reference to FIG. 5.

If it is determined that there is a staying risk (step S6: No), the control device 30 returns to the processing of the step S3. In this case, the alarm control can be continued. On the other hand, if it is determined that there is no staying risk (step S6: Yes), the control device 30 determines whether the occupant exists in the vehicle based on detection results of the occupant detection sensors such as the occupant camera 17, the seating sensor 19*a*, and the seat belt sensor 19*b* (step S7).

For example, in the step S7, it is determined whether there is a person in the vehicle based on an imaging result of the interior of the vehicle by the occupant camera 17, and if there is a human in the vehicle, it is determined that the occupant exists in the vehicle. In the step S7, it is determined whether the occupant is seated on any seat ST (whether there is a heavy object on any seat ST) based on the detection result of the seating sensor 19*a*, and if the occupant is seated on any seat ST, it is determined that the occupant exists in the vehicle. Furthermore, in the step S7, it is determined whether the seat belt on any seat ST is in a fastened state based on the detection result of the seat belt sensor 19*b*, and if the seat belt on any seat ST is in the fastened state, it is determined that the occupant exists in the vehicle. If it is determined that the occupant exists in the vehicle by any of these determinations (step S7: No), the control device 30 returns to the processing of the step S3. In this case, the alarm control can be continued. Note that the processing of the step S7 is not essential and can be omitted.

On the other hand, if it is determined that the occupant does not exist in the vehicle (step S7: Yes), the control device 30 ends the alarm control (step S8). Then, the control device 30 stops the power supply from the battery BAT to the sensor group 10 by turning off the switch SW of the power circuit PS (step S9), and ends the series of processing shown in FIG. 4. In this way, the control device 30 stops the power supply from the battery BAT to the sensor group 10 when ending the alarm control, thereby preventing the sensor group 10 from wasting the limited power of the battery BAT.

As described above, when the door DR is locked, the control device 30 (for example, the management unit 32) determines whether there is a staying risk of the occupant based on the locking method of the door DR, and can end the alarm control depending on the determination result. As a result, the alarm control can be ended in consideration of the locking method for the door DR, and specifically, the alarm control can be ended when it is considered that the occupant completes getting off the vehicle according to the locking method for the door DR. Therefore, it is possible to appropriately end the alarm control, and it is possible to prevent the increase in power consumption due to the continued execution of the alarm control while ensuring the safety.

The control device 30 (for example, the management unit 32) further determines whether the occupant exists in the vehicle, when the door DR is locked, based on the detection result of the occupant detection sensor, and can end the alarm control based on determining that the occupant does not exist in the vehicle. As a result, by also referring to the detection result of the occupant detection sensor, it is possible to end the alarm control when it is considered more probable that the occupant completes getting off the vehicle.

The occupant detection sensor can be at least one of the occupant camera 17 that captures an image of the interior of the vehicle, the door sensor 18 that detects opening or closing of the door DR, the seating sensor 19a that is provided on the seat ST of the vehicle 1, and the seat belt sensor 19b that detects attachment or detachment of the seat belt provided on the seat ST In this way, it is possible to accurately detect whether the occupant exists in the vehicle.

The notification device used for the alarm control is capable of executing the notification that affects at least one of sight and hearing of the occupant. An example of the notification device capable of executing the notification that affects sight is the BSI indicator 25 described above. An example of the notification device capable of executing the notification that affects hearing is the speaker 22 described above. In this way, by executing the notification that affects at least one of sight and hearing of the occupant by the notification control, it is possible to execute notification that is intuitively understandable to the occupant.

The control device 30 (for example, the management unit 32) can end the alarm control when a predetermined period elapses since the alarm control starts. Here, the control device 30 (for example, the management unit 32) can change a length of the predetermined period until the alarm control ends according to a behavior of the door DR after the alarm control starts (that is, after the ignition power is turned off).

For example, the management unit 32 ends the alarm control when none of the opening, closing, unlocking, and locking of the door DR is performed after the alarm control starts and a first period (for example, 3 minutes) elapses since the alarm control starts. On the other hand, the management unit 32 ends the alarm control when at least one of the opening, closing, unlocking, and locking of the door DR is performed after the alarm control starts and a second period (for example, 6 minutes) longer than the first period elapses since the alarm control starts. In this way, while preventing the increase in power consumption due to continued execution of the alarm control over a long period, the alarm control is performed for a certain period when the occupant may stay in the vehicle, so that the safety of the vehicle 1 can be improved.

FIG. 5 is a diagram showing specific examples of the door locking methods for the door DR. As shown in FIG. 5, examples of the locking method for the door DR include the exterior locking of locking the door DR from the exterior of the vehicle, the communication locking of locking the door DR in response to the locking request sent from the terminal device (remote control key) capable of communicating with the vehicle 1, and the interior locking of locking the door DR while the occupant remains in the vehicle.

Examples of the exterior locking include locking using a key, locking using a smart key system, and locking without using a key. The communication locking includes locking using a keyless entry system. Examples of the interior locking include locking using a doorknob or a master door lock switch provided inside the door DR. Note that specific examples of locking operation for performing each locking is as shown in FIG. 5.

As shown in FIG. 5, when the door DR is locked by the exterior locking, the control device 30 (for example, the management unit 32) determines that there is no staying risk of the occupant by the processing of the steps S5 and S6 described above, and then ends the alarm control. On the other hand, when the door DR is locked by the interior locking, the control device 30 (for example, the management unit 32) determines that there is a staying risk of the occupant by the processing of the steps S5 and S6 described above, and then ends the alarm control.

When the door DR is locked by the communication locking, the control device 30 (for example, the management unit 32) determines whether to end or continue the alarm control depending on a position of the remote control key, which is the terminal device. Specifically, as shown in FIG. 5, when the remote control key is outside the vehicle, the control device 30 (for example, the management unit 32) determines that there is no staying risk of the occupant, and then ends the alarm control. On the other hand, when the remote control key is inside the vehicle, the control device 30 (for example, the management unit 32) determines that there is a staying risk of the occupant, and then continues the alarm control. In this way, when the door DR is locked by the communication locking, the alarm control is ended on the condition that the terminal device used for the communication locking does not exist in the vehicle, so that it is possible to end the alarm control when it is considered highly probable that the occupant completes getting off the vehicle.

Although the embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. The respective constituent elements in the above embodiments may be combined as desired without departing from the gist of the invention.

At least the following matters are described in the present description. Components corresponding to those according to the above embodiment described above are shown in parentheses. However, the present invention is not limited thereto.

(1) A control device (control device 30) for controlling a vehicle (vehicle 1) including an external sensor (sensor group 10) that acquires surrounding information of the vehicle and a notification device (speaker 22, BST indicator 25) capable of executing a predetermined notification to an occupant of the vehicle, the control device including a processing unit (processing unit 31) configured to execute alarm control for causing the notification device to execute the notification, when an object that has a possibility of colliding with the vehicle exists around the vehicle, based on the surrounding information acquired by the external sensor, in which the processing unit includes a management unit (management unit 32) capable of ending processing by the processing unit when a door of the vehicle is locked, and the management unit ends the processing by the processing unit or continues the processing by the processing unit depending on a locking method for the door.

According to (1), by ending the processing by the processing unit in consideration of the locking method for the door, the processing by the processing unit that executes the alarm control or the like can be appropriately ended when it is considered that the occupant completes getting off the vehicle, and therefore, it is possible to prevent the increase in power consumption due to the processing unit continuing to execute the processing.

(2) The control device according to (1), in which
the locking method includes exterior locking of locking the door from outside the vehicle, and
the management unit ends the processing by the processing unit when the door is locked by the exterior locking.

According to (2), it is possible to end the processing by the processing unit when it is considered highly probable that the occupant completes getting off the vehicle.

(3) The control device according to (1) or (2), in which
the locking method includes communication locking of locking the door in response to a locking request sent from a terminal device capable of communicating with the vehicle, and
the management unit determines whether the terminal device exists in the vehicle when the door is locked by the communication locking, and based on a determination that the terminal device does not exist in the vehicle, ends the processing by the processing unit.

According to (3), it is possible to end the processing by the processing unit when it is considered highly probable that the occupant completes getting off the vehicle.

(4) The control device according to (2) or (3), in which
the management unit further determines whether the occupant exists in the vehicle, when the door is locked, based on a detection result of an occupant detection sensor, and ends the processing by the processing unit based on a determination that the occupant does not exist in the vehicle.

According to (4), it is possible to end the processing by the processing unit when it is considered more probable that the occupant completes getting off the vehicle.

(5) The control device according to (4), in which
the occupant detection sensor is at least one of an imaging device that captures an image of an interior of the vehicle, a door sensor that detects opening or closing of the door, a seating sensor that is provided on a seat of the vehicle, and a seat belt sensor that detects attachment or detachment of a seat belt provided on the seat.

According to (5), it is possible to accurately detect whether the occupant exists in the vehicle.

(6) The control device according to any one of (1) to (5), in which
the external sensor detects at least lateral sides and a rear side of the vehicle, and
in the alarm control, the processing unit causes the notification device to execute the notification when the object exists on the lateral sides or the rear side of the vehicle.

According to (6), it is possible to perform the notification to the occupant when an object that may collide with the vehicle exists on the lateral side or the rear side of the vehicle, which is likely to be a blind spot for the occupant, and to improve the safety.

(7) The control device according to any one of (1) to (6), in which
the notification device is capable of executing the notification that affects at least one of sight and hearing of the occupant.

According to (7), it is possible to execute the notification that is intuitively understandable to the occupant.

(8) The control device according to any one of (1) to (7), in which
the management unit
is also capable of ending the alarm control when a predetermined period elapses from a start of the alarm control,
ends the alarm control when none of the opening, closing, unlocking, and locking of the door is performed after the alarm control starts and a first period elapses from the start of the alarm control, and
ends the alarm control when at least one of the opening, closing, unlocking, and locking of the door is performed after the alarm control starts and a second period longer than the first period elapses from the start of the alarm control.

According to (8), while preventing the increase in power consumption due to continued execution of the alarm control over a long period, the alarm control is performed for a certain period when the occupant may stay in the vehicle, so that the safety can be improved.

(9) The control device according to any one of (1) to (8), in which
the management unit stops power supply from a battery of the vehicle to the external sensor when ending the processing by the processing unit.

According to (9), by stopping the power supply from the battery of the vehicle to the external sensor when the processing by the processing unit is ended, it is possible to prevent the external sensor from wasting the limited battery power.

What is claimed is:

1. A control device for controlling a vehicle including an external sensor that acquires surrounding information of the vehicle and a notification device capable of executing a predetermined notification to an occupant of the vehicle, the control device comprising processing circuitry configured to execute alarm control for causing the notification device to execute the notification, when an object that has a possibility of colliding with the vehicle exists around the vehicle, based on the surrounding information acquired by the external sensor, wherein
the processing circuitry is capable of ending processing for the alarm control when a door of the vehicle gets locked,
the processing circuitry ends the processing for the alarm control or continues the processing for the alarm control depending on a locking method for the door,
the locking method includes exterior locking of locking the door from outside the vehicle and interior locking of locking the door from inside the vehicle,
the processing circuitry ends the processing for the alarm control when the door gets locked by the exterior locking, and continues the processing for the alarm control when the door gets locked by the interior locking,
the exterior locking is a method of locking the door by physically operating a locking operation unit mounted on an exterior of the door,
the interior locking is a method of locking the door by physically operating a locking operation unit mounted on an interior of the door,
the locking method further includes communication locking of locking the door in response to a locking request sent from a terminal device capable of communicating with the vehicle and being moved from being inside the vehicle and outside the vehicle, the terminal being different from the locking operation unit mounted on the exterior of the door and the locking operation unit mounted on the interior of the door, and the processing circuitry determines whether the terminal device exists in the vehicle when the door is locked by the communication locking, and based on a determination that the terminal device does not exist in the vehicle, ends the processing for the alarm control.

2. The control device according to claim 1, wherein
the processing circuitry further determines whether the occupant exists in the vehicle, when the door gets locked, based on a detection result of an occupant detection sensor, and ends the processing for the alarm control based on a determination that the occupant does not exist in the vehicle.

3. The control device according to claim 2, wherein
the occupant detection sensor is at least one of an imaging device that captures an image of an interior of the vehicle, a door sensor that detects opening or closing of the door, a seating sensor that is provided on a seat of the vehicle, and a seat belt sensor that detects attachment or detachment of a seat belt provided on the seat.

4. The control device according to claim 1, wherein
the external sensor detects at least lateral sides and a rear side of the vehicle, and
in the alarm control, the processing circuitry causes the notification device to execute the notification when the object exists on the lateral sides or the rear side of the vehicle.

5. The control device according to claim 1, wherein
the notification device is capable of executing the notification that affects at least one of sight and hearing of the occupant.

6. The control device according to claim 1, wherein
the processing circuitry
is also capable of ending the alarm control when a predetermined period elapses from a start of the alarm control,
ends the alarm control when none of opening, closing, unlocking, and locking of the door is performed after the alarm control starts and a first period elapses from the start of the alarm control and
ends the alarm control when at least one of the opening, closing, unlocking, and locking of the door is performed after the alarm control starts and a second period longer than the first period elapses from the start of the alarm control.

7. The control device according to claim 1, wherein
the processing circuitry stops power supply from a battery of the vehicle to the external sensor when ending the processing for the alarm control.

8. The control device according to claim 1, wherein
the processing circuitry continues the processing for the alarm control based on a determination that the terminal device exists in the vehicle.

* * * * *